United States Patent
Ishiguro et al.

(10) Patent No.: US 7,614,656 B2
(45) Date of Patent: Nov. 10, 2009

(54) AIRBAG APPARATUS

(75) Inventors: Naohiko Ishiguro, Aichi-ken (JP); Hitoshi Iida, Aichi-ken (JP); Atsushi Nagata, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 280 days.

(21) Appl. No.: 11/727,598

(22) Filed: Mar. 27, 2007

(65) Prior Publication Data

US 2007/0228710 A1 Oct. 4, 2007

(30) Foreign Application Priority Data

Mar. 28, 2006 (JP) ............................. 2006-088570

(51) Int. Cl.
*B60R 21/16* (2006.01)
(52) U.S. Cl. .................. 280/743.1; 280/743.2
(58) Field of Classification Search ............... 280/732, 280/738, 743.1, 743.2
See application file for complete search history.

(56) References Cited

U.S. PATENT DOCUMENTS

| | | | |
|---|---|---|---|
| 6,749,217 B2 * | 6/2004 | Damian et al. ............... | 280/734 |
| 6,832,778 B2 * | 12/2004 | Pinsenschaum et al. ..... | 280/739 |
| 6,918,614 B2 * | 7/2005 | Ryan ......................... | 280/743.2 |
| 6,932,385 B2 * | 8/2005 | Hawthorn et al. ............ | 280/739 |
| 7,134,691 B2 * | 11/2006 | Dunkle et al. .............. | 280/743.2 |
| 7,192,053 B2 * | 3/2007 | Thomas ....................... | 280/739 |
| 7,195,281 B2 * | 3/2007 | Williams et al. .......... | 280/743.2 |
| 7,377,546 B2 * | 5/2008 | Fischer et al. .............. | 280/739 |
| 7,475,906 B2 * | 1/2009 | Goto et al. ................ | 280/743.2 |
| 7,490,854 B2 * | 2/2009 | Thomas ..................... | 280/739 |

FOREIGN PATENT DOCUMENTS

JP A-06-286543 10/1994

* cited by examiner

*Primary Examiner*—Toan C To
(74) *Attorney, Agent, or Firm*—Posz Law Group, PLC

(57) ABSTRACT

The airbag apparatus includes an airbag having a tether including an occupant side tether belt and a vehicle body side tether belt. An intermediate portion of the vehicle body side tether belt is held at the side of a housing of the airbag by a retaining mechanism. At full inflation of the airbag, the clearance between the side of the housing and the occupant side tether belt is reduced when the vehicle body side belt is retained by the retaining mechanism whereas the clearance is enlarged when the vehicle body side tether belt is released from the retaining mechanism. The occupant side tether belt and the vehicle body side tether belt are linked with each other so that a central area of a protection plane of an occupant side wall of the airbag in the former case is generally parallel to the central area in the latter.

6 Claims, 14 Drawing Sheets

AIRBAG APPARATUS

The present application claims priority from Japanese Patent Application No. 2006-088570 of Ishiguro et al., filed on Mar. 28, 2006, the disclosure of which is hereby incorporated into the present application by reference.

BACKGROUND OF THE INVENTION

1. Field of the Invention

The present invention relates to an airbag apparatus provided with a bag-shaped airbag which is folded and housed and is inflatable with inflation gas.

2. Description of Related Art

An airbag apparatus is known from JP 6-286543: the apparatus has an airbag, and the bag is provided with an occupant-side tether belt joined to a panel facing an occupant, and a vehicle body side tether belt joined to the side of a housing. Both of the tether belts are arranged in a circle inside the airbag and linked together at a point of the circular contours.

The occupant-side tether belt is provided with a breakable portion that is broken during airbag inflation to disconnect the linkage of the tether belts. More specifically, at an initial stage of airbag inflation, the occupant-side panel of the airbag is developed wide with the tether belts linked together. Thereafter, the occupant-side tether belt is broken to disconnect the linkage with the vehicle body side tether belt. Then the occupant-side panel developed wide is shifted toward the occupant with no change in its orientation, and thus the airbag inflation is completed. In this airbag apparatus, however, because of the breakage of the occupant-side tether belt, a clearance between the occupant-side panel and the side of the housing is no longer regulated. Accordingly, it is hard to regulate the contour of the fully inflated airbag depending upon where the occupant is seated.

SUMMARY OF THE INVENTION

An object of the present invention is to provide an airbag apparatus which is capable of adjusting the contour of a fully inflated airbag for proper protection of an occupant.

Such an airbag apparatus includes a bag-shaped airbag folded and housed in a housing and inflatable with inflation gas, the airbag including an occupant side wall arranged toward a seat upon airbag inflation and a vehicle body side wall arranged toward the housing upon airbag inflation and attached to the housing; a tether joined to a side of the housing and the occupant side wall inside the airbag for regulating a clearance between the occupant side wall and the housing upon airbag inflation; a control device deciding upon a preferred mode of the airbag of receiving an occupant; and a retaining mechanism controlled by the control device. The tether includes an elongate first tether element joined to the occupant side wall and an elongate second tether element linked with the first tether element and joined to the side of the housing. The retaining mechanism holds an intermediate portion of the second tether element disposed between the side of the housing and a link portion with the first tether element at the side of the housing to reduce a clearance in the second tether element between the housing and the first tether element, and the retaining mechanism releases the intermediate portion of the second tether element to enlarge the clearance in the second tether element between the housing and the first tether element, thereby varying a clearance between the occupant side wall and the housing at full inflation of the airbag. The first tether element is linked with the second tether element in such a manner that a link portion of the first tether element with the second element is slidable on the second tether element, such that a central area of a protection plane of the occupant side wall for arresting the occupant at the time the clearance between the occupant side wall and the housing is reduced and the central area of the protection plane at the time the clearance between the occupant side wall and the housing is enlarged are generally parallel at full inflation of the airbag.

In the airbag apparatus of the present invention, the airbag inflates while the clearance between the occupant side wall and the housing of airbag is varied depending on a seated occupant. If, for example the control device detects that an undersized occupant is seated proximate the steering wheel, the airbag inflates in a condition where the intermediate portion of the second tether element joined to the side of the housing is retained by retaining mechanism. That is, the airbag inflates with a reduced clearance between the occupant side wall and the housing by the tether. Accordingly, the airbag protects the undersized occupant seated proximate the steering wheel properly without pushing the occupant unduly. To the contrary, if the control device detects that a large occupant is seated away from the airbag device, the airbag inflates with the intermediate portion of the second tether element released from the retaining mechanism. That is, the airbag inflates with a large clearance between the occupant side wall and the housing by the tether. Hence the airbag inflates thickly and protects the large driver having a great kinetic energy with sufficient cushioning property.

In the airbag apparatus of the present invention, the first tether element joined to the occupant side wall is linked with the second tether element joined to the side of the housing in such a manner that the link portion of the first tether element with the second is slidable on the second tether element. With this structure, the clearance in the second tether element between the housing and the first tether element is variable into a reduced clearance and a large clearance, thereby varying the clearance between the occupant side wall and the housing. The airbag inflates with a generally parallel central area of a protection plane in the occupant side wall with either clearance. That is, the central area of the protection plane at the time the intermediate portion of the second tether element is retained by the retaining mechanism and the central area at the time the intermediate portion is released from the retaining mechanism are generally parallel at full inflation of the airbag. Accordingly, the fully inflated airbag will protect the occupant in a stable manner with its protection plane having a constant orientation irrespective of whether the clearance between the occupant side wall and the housing is set small or large.

Therefore, with the airbag apparatus of the present invention, the contour of the airbag at full inflation is controllable depending upon a distance of the occupant from the airbag device or a seating position of the occupant, so that the occupant will be properly protected by the fully inflated airbag.

In the airbag apparatus of the present invention, moreover, the clearance between the occupant side wall and the housing is adjusted by operating a single retaining mechanism by the control device to release or retain the intermediate portion of the second tether element when the airbag inflates. In other words, the contour of the airbag at full inflation is controlled by the single retaining mechanism. This will simplify the structure of the airbag apparatus, and will conduce to reduce the weight of the apparatus and the cost required to manufacture the apparatus.

In the above airbag apparatus, it is desired that the first tether element extends in a bifurcate or radial fashion from the link portion with the second tether element, and is joined to the occupant side wall at ends of portions thereof extending in the bifurcate or radial fashion, and that an area of the occupant side wall encircled by joint regions of the first tether element and the occupant side wall constitutes the central area of the protection plane. With this structure, a flat plane for arresting the occupant is easily obtained in comparison with a case where the first tether element is joined to the occupant side wall at only one position, so that the orientation of the central area of the protection plane will be stabilized at full inflation of the airbag.

In the above airbag apparatus, it is further desired that the second tether element is joined to the side of the housing at its opposite ends, and that the second tether element is linked with the first tether element at its intermediate region.

Furthermore, it is desired that the first and second tether elements have both band shape, and each of them is joined to the occupant side wall/the vehicle body side wall at respective opposite ends of the length direction, and that the first and second tether elements are linked with each other in a crossing manner at their respective intermediate regions so that the first and second tether elements are overlaid one on the other at the intermediate regions and retain each other.

With this structure, band-shaped first and second tether elements are overlaid one on the other at respective planar link portions and hold each other at the planar link portions in a stable manner. This will conduce to even the orientation of the protection plane of the airbag either when the intermediate portion of the second tether element is retained by the retaining mechanism or when it is released from the retaining mechanism.

In the above airbag apparatus, moreover, if the first tether element and the second tether element are arranged generally orthogonal to each other in a plan view, the first and second tether elements will slide on each other at the link portions smoothly upon airbag deployment.

It is also desired that the second tether element has a width wide enough to cover sides of an inflator arranged inside the airbag for supplying inflation gas, and that the second tether element is joined to the vicinity of the sides of the inflator at the opposite ends thereof such that the second tether element redirects the inflation gas toward the width direction of the second tether element inside the airbag. This structure will help control the direction of the inflation gas flowing into the airbag.

In this case, if the second tether element is arranged along the lateral direction of vehicle, the airbag will rapidly deploy along the width direction of the second tether element, i.e., the longitudinal direction or vertical direction. That is, the airbag will rapidly deploy vertically or longitudinally wide in front of a head and abdomen of the occupant to protect them.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
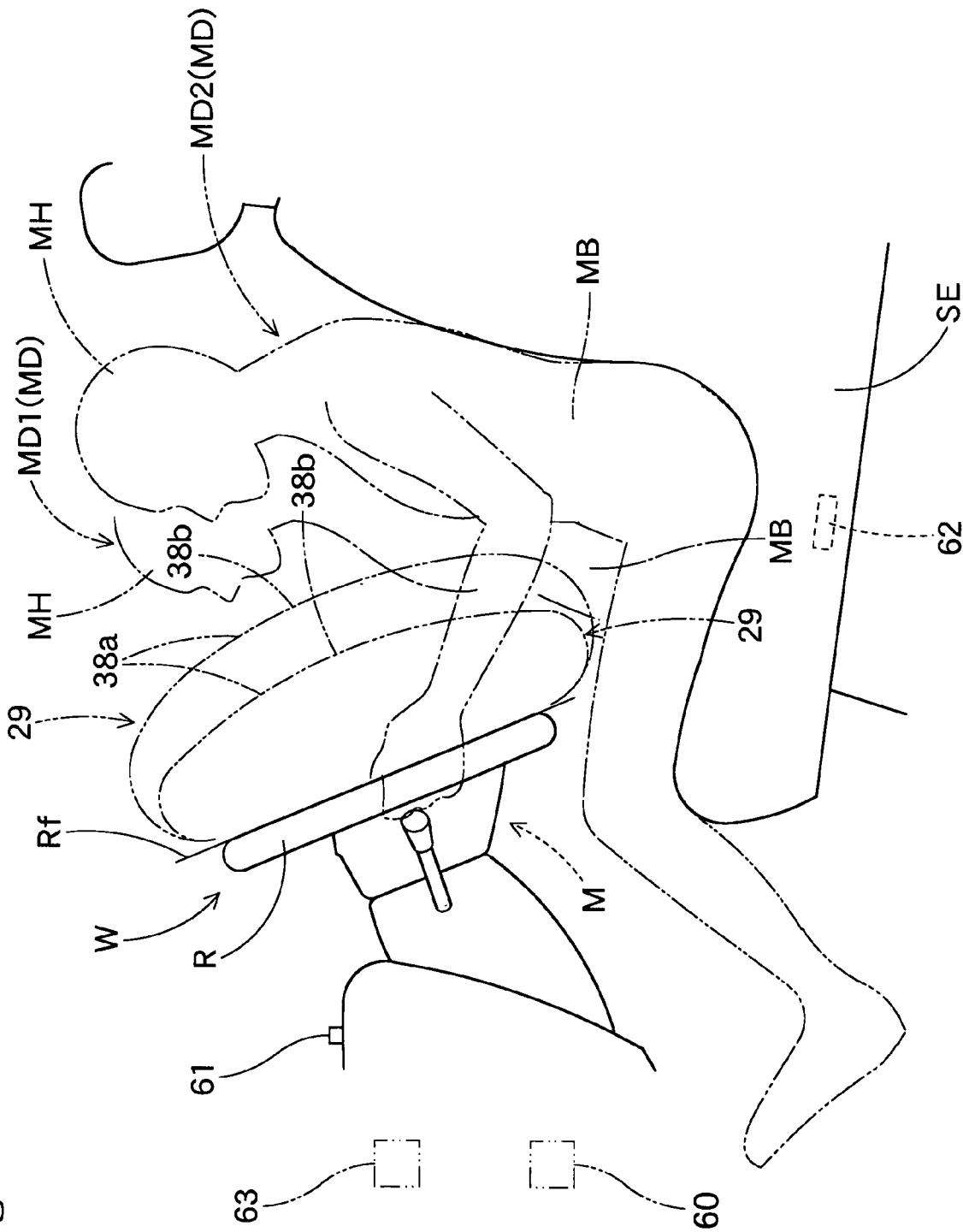
FIG. 1 illustrates a steering wheel including an airbag apparatus embodying the present invention and an occupant (driver) as viewed from the side.
Figure 2:
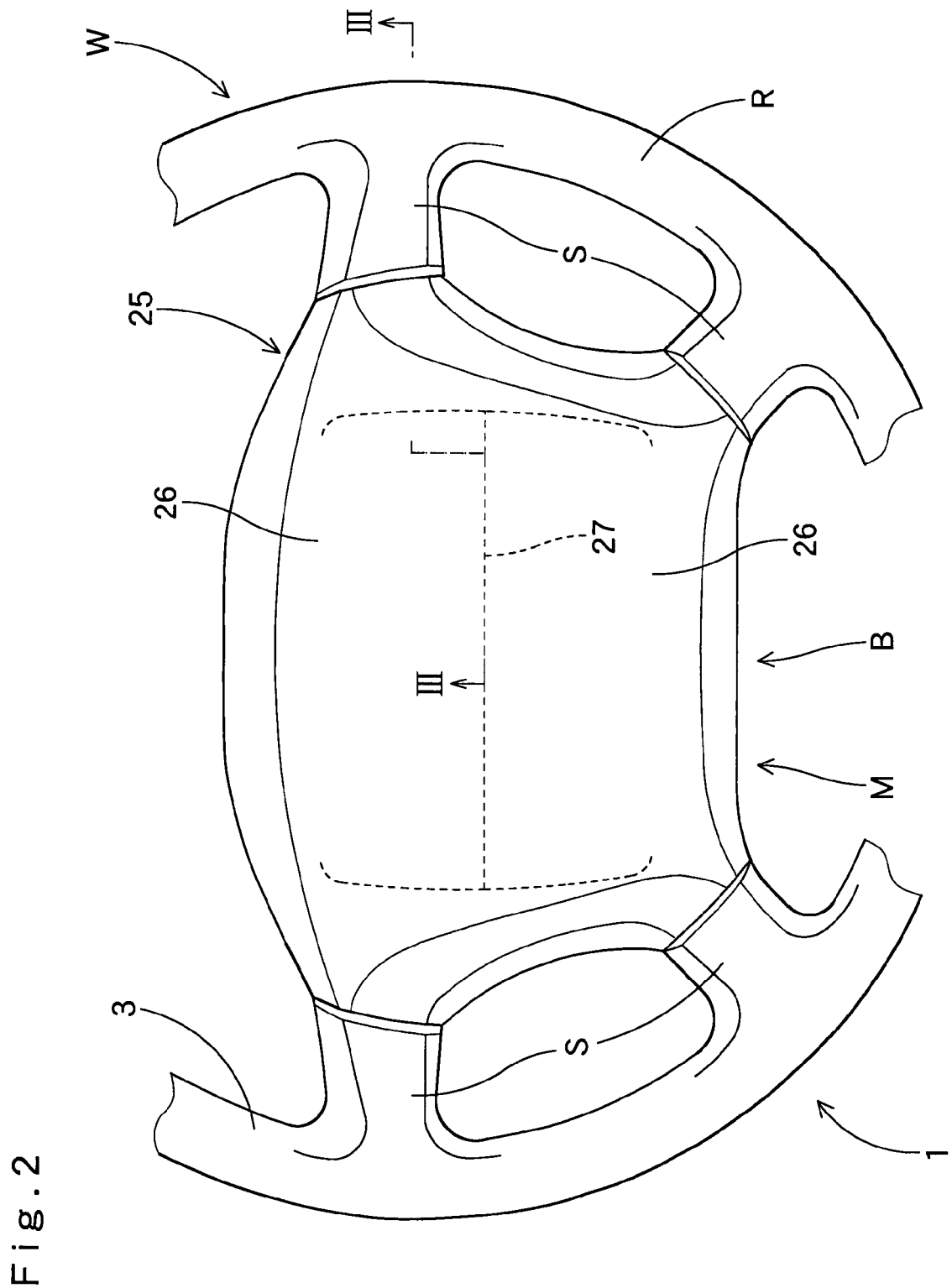
FIG. 2 is a partial plan view of the steering wheel of FIG. 1 showing the way the airbag apparatus is mounted thereon.
Figure 3:
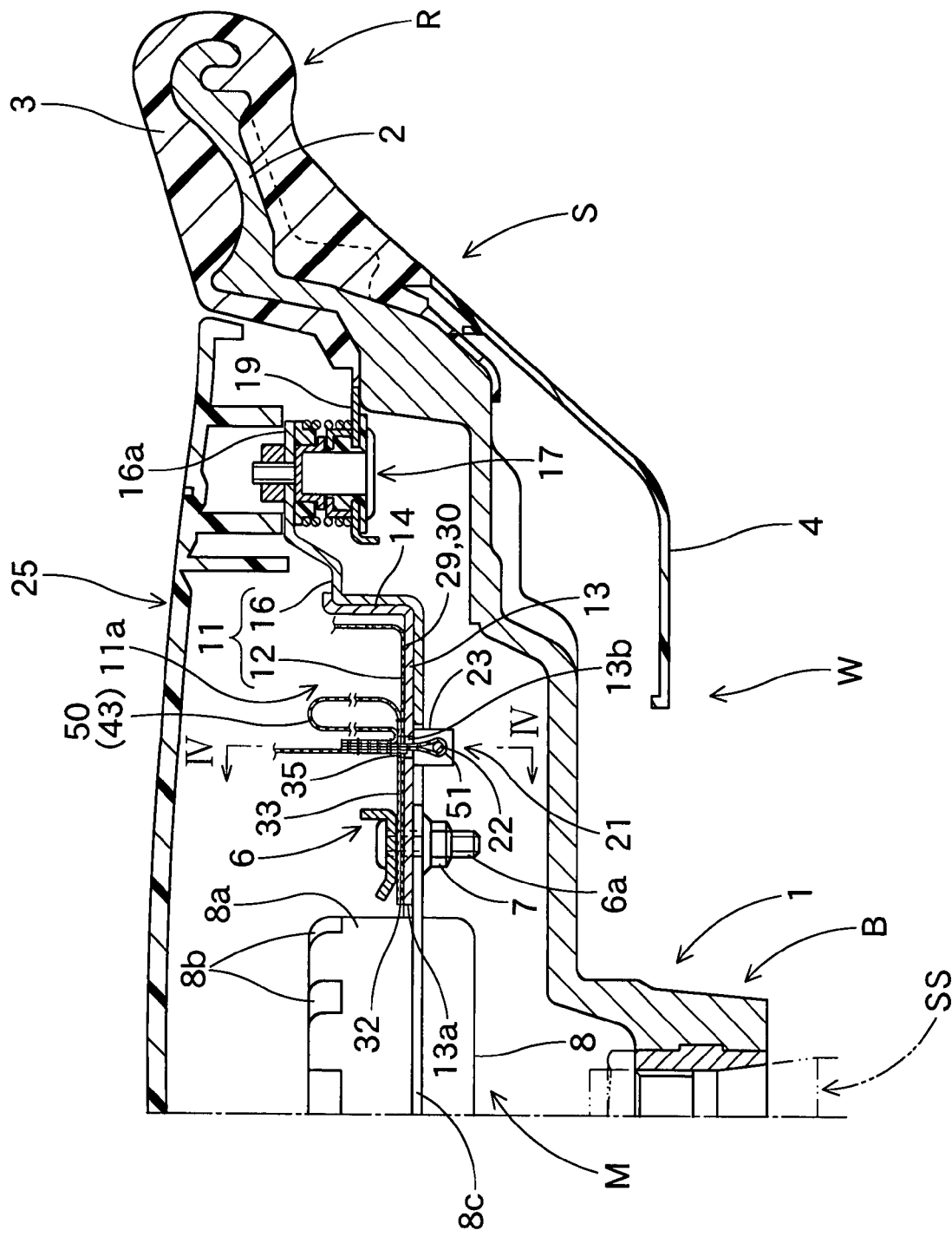
FIG. 3 is a schematic section of the airbag apparatus of the present invention, taken along line III-III of FIG. 2.

FIGS. 1 to 3 illustrate an airbag apparatus M for a steering wheel W embodying the present invention.

Unless otherwise specified, the front-rear, up-down, and left-right directions in this specification are based on steering wheel W mounted on a vehicle and steered straight ahead. Specifically, the up-down is defined by the up-down direction extending along the axial direction of a steering shaft SS (refer to phantom lines in FIG. 3) on which steering wheel W is to be mounted. The front-rear is defined by the vehicle's front-rear direction running orthogonal to the axial direction of steering shaft SS, and the left-right is defined by the vehicle's lateral direction running orthogonal to the axial direction of steering shaft SS.

As shown in FIGS. 2 and 3, airbag apparatus M is mounted on top of boss B at the center of steering wheel W. Steering wheel W includes a ring R, a boss B and four spokes S. Ring R is for holding at the time of steering operation. Boss B is disposed at the center of steering wheel W and is joined with steering shaft SS. Spokes S connect ring R and boss B. Steering wheel W includes, as components, an airbag device M and a steering wheel body 1.

Wheel body 1 includes a wheel core 2, a cladding layer 3 and a lower cover 4. Wheel core 2 is fabricated of aluminum alloy or the like and has such a configuration as to connect ring R, boss B and spokes S. Cladding layer 3 is made from synthetic resin for covering core 2 at ring R and regions of spokes S in the vicinity of ring R. Lower cover 4 is fabricated of synthetic resin and is disposed below boss B.

As shown in FIG. 3, airbag apparatus M includes a folded airbag 29, an inflator 8 for supplying airbag 29 with inflation gas, a housing or bag holder 11 which houses and holds airbag 29 and inflator 8, a pad 25 serving as an airbag cover to cover an opening 11a of bag holder 11, and a retaining mechanism 21 for retaining a later-described loop 51 formed at an intermediate position of a vehicle body side tether belt 50 arranged inside airbag 29. Inflator 8 and retaining mechanism 21 are under control of a control device 60.

As shown in FIG. 1, control device 60 is electrically communicated with such driver sensors as a position sensor 61 for monitoring the size of an occupant or driver MD seated in a seat SE and a clearance between steering wheel W and occupant MD and a weight sensor 62 monitoring the weight of occupant MD, and a crash sensor 63 for detecting the acceleration of vehicle and direction of acceleration. Control device 60 operates inflator 8 and retaining mechanism 21 in response to electric signals fed from these sensors.

As shown in FIG. 3, inflator 8 includes a body 8a and a flange 8c. Inflator body 8a is substantially columnar in shape, and is provided on its top with gas discharge ports 8b for discharging inflation gas. Flange 8c projects from the outer circumference of the body 8a in a generally square plate shape. Flange 8c has insert holes (no reference numeral) for receiving bolts 6a of a later-described retainer 6.

Retainer 6 is made of sheet metal of generally square annular shape, and has bolts 6a protruded downward from its four corners. Bolts 6a are inserted through the periphery 33 of a later-described gas inlet port 32 of airbag 29 and bag holder 11 from the interior of the airbag 29 to project from flange 8c of inflator 8, and then are fastened into nuts 7. Thus retainer 6 attaches airbag 29 and inflator 8 to bag holder 11.

As shown in FIG. 3, bag holder 11 includes a holder body 12 and a holder plate 16 both of which are made of sheet metal. Holder body 12 includes a bottom wall 13 having a generally square plate shape and a side wall 14 extending upward from the outer edge of bottom wall 13 and opened upward. Bottom wall 13 has a round insert hole 13a for receiving inflator body 8a from lower side. In a right periphery of insert hole 13a of bottom wall 13 is an aperture 13b which loop 51 of vehicle body side tether belt 50 of airbag 29 is put through.

Figure 4:
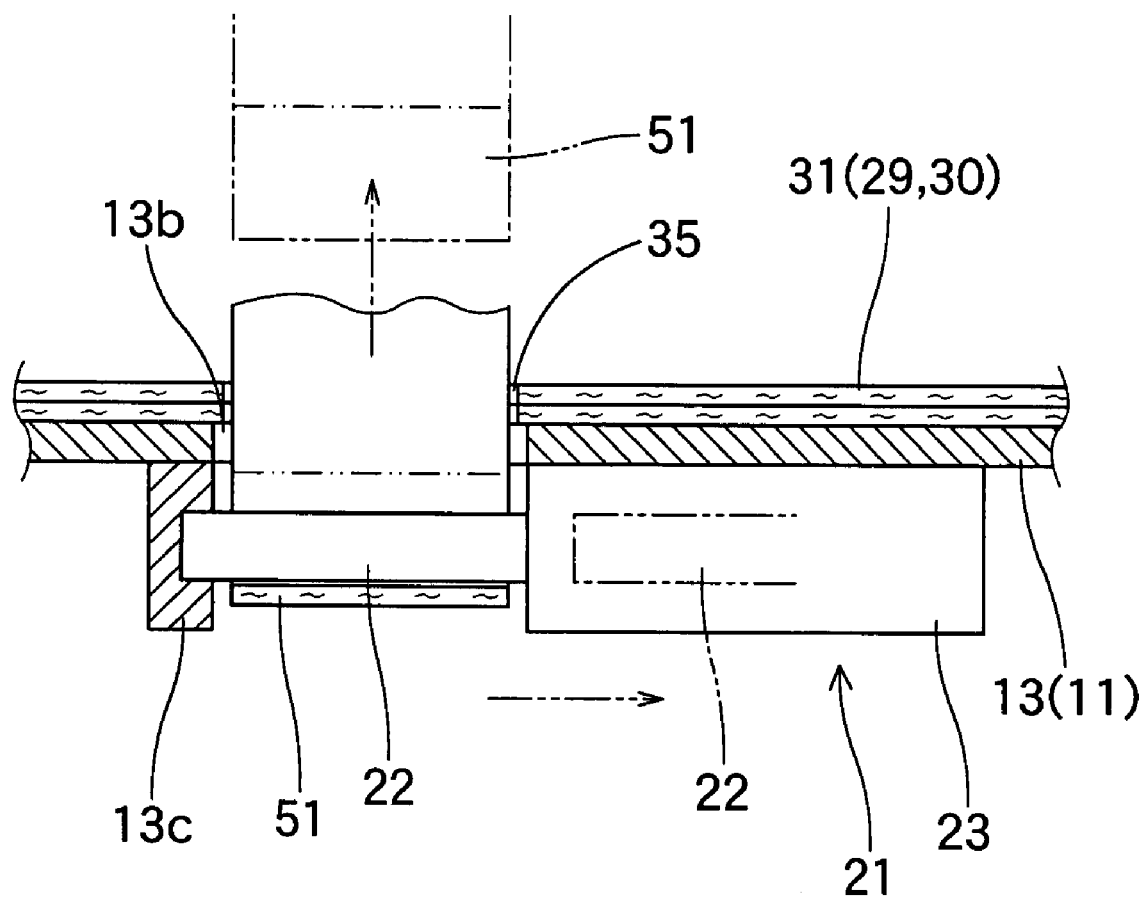
FIG. 4 is a partial schematic section of the airbag apparatus of FIG. 3, taken along line IV-IV of FIG. 3.
Figure 5:
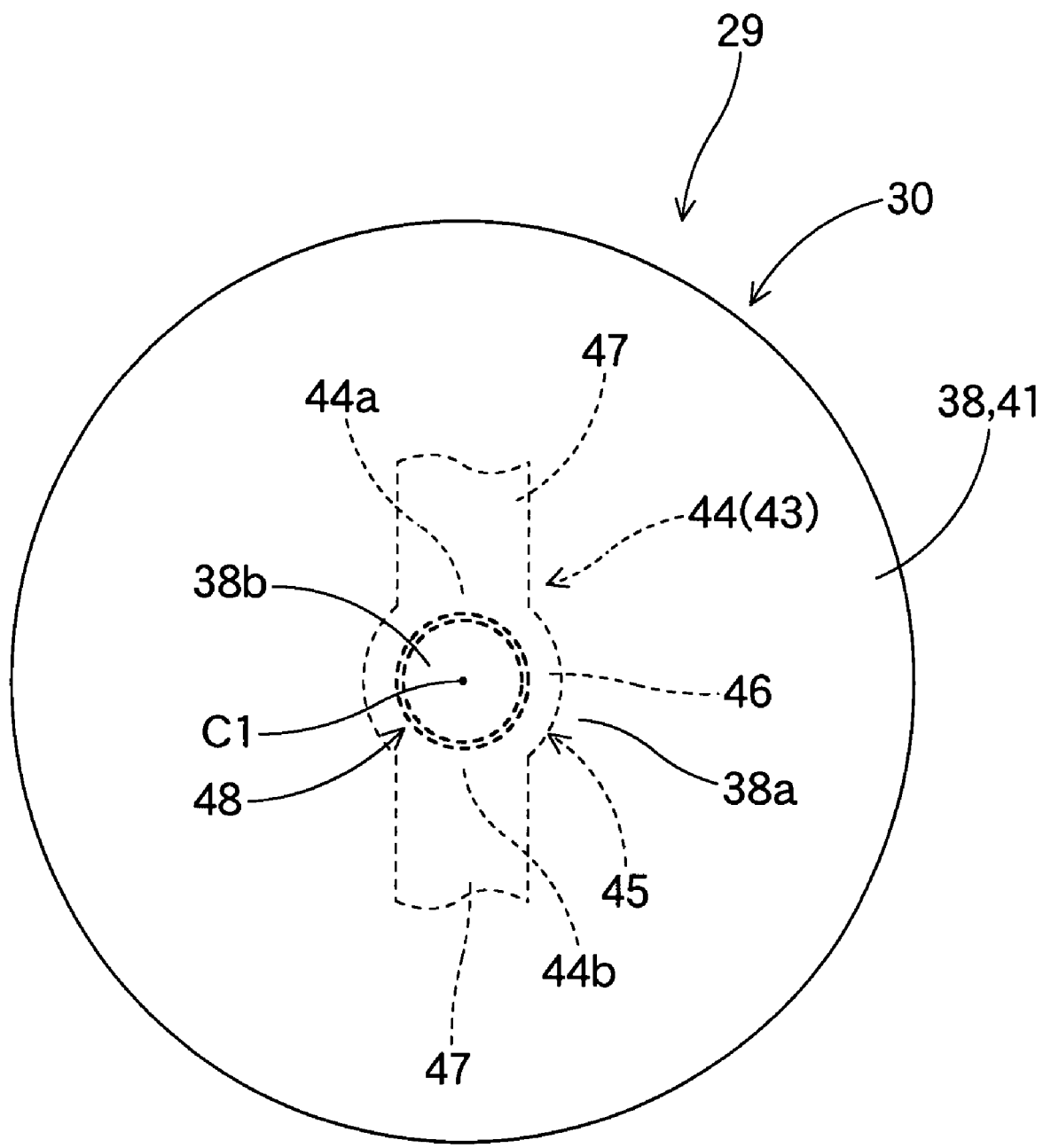
FIG. 5 is a plan view of an airbag used for the airbag apparatus of FIG. 3 in a flattened state.
Figure 6:
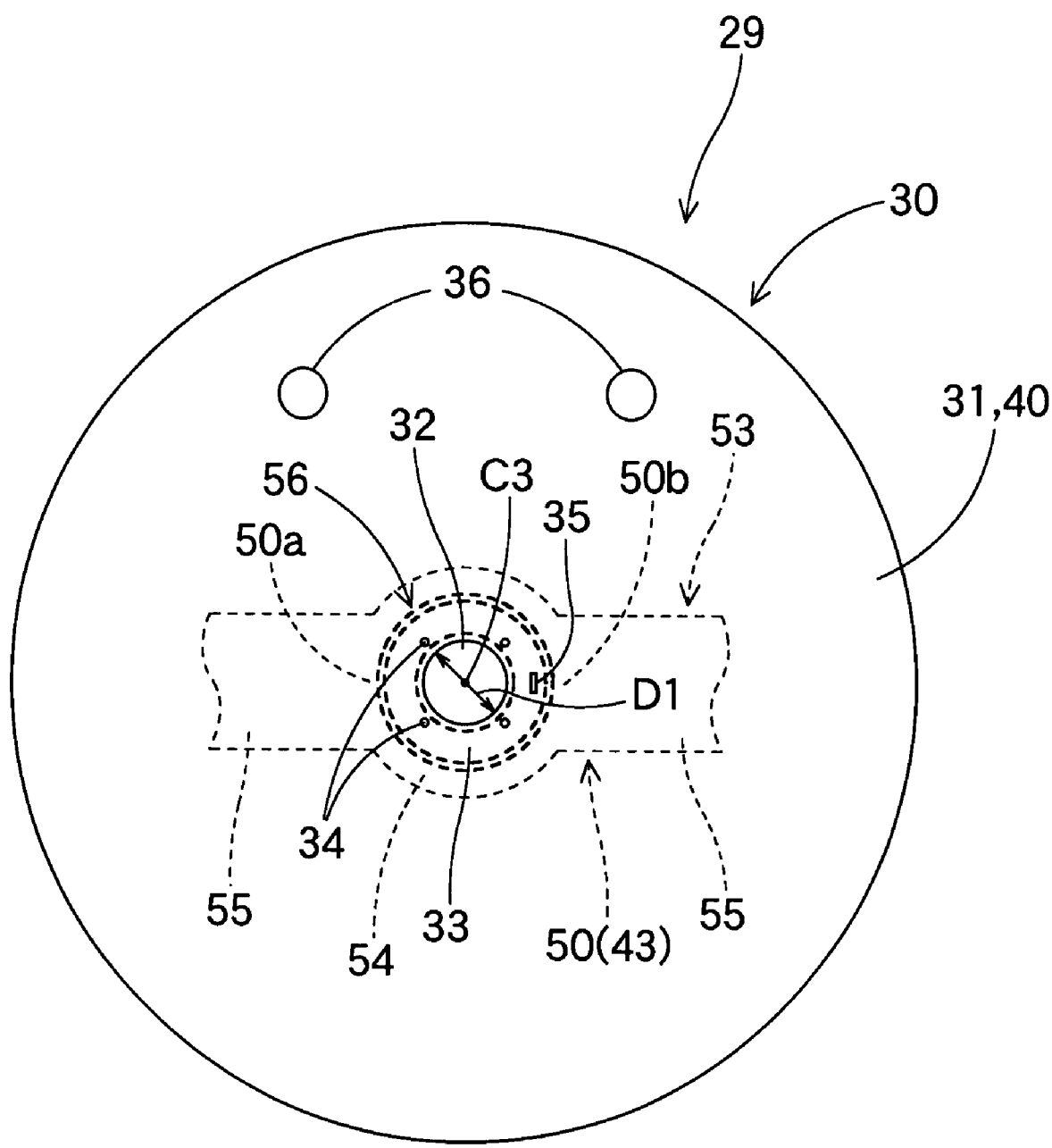
FIG. 6 is a bottom view of the airbag of FIG. 5 in the flattened state.
Figure 7:
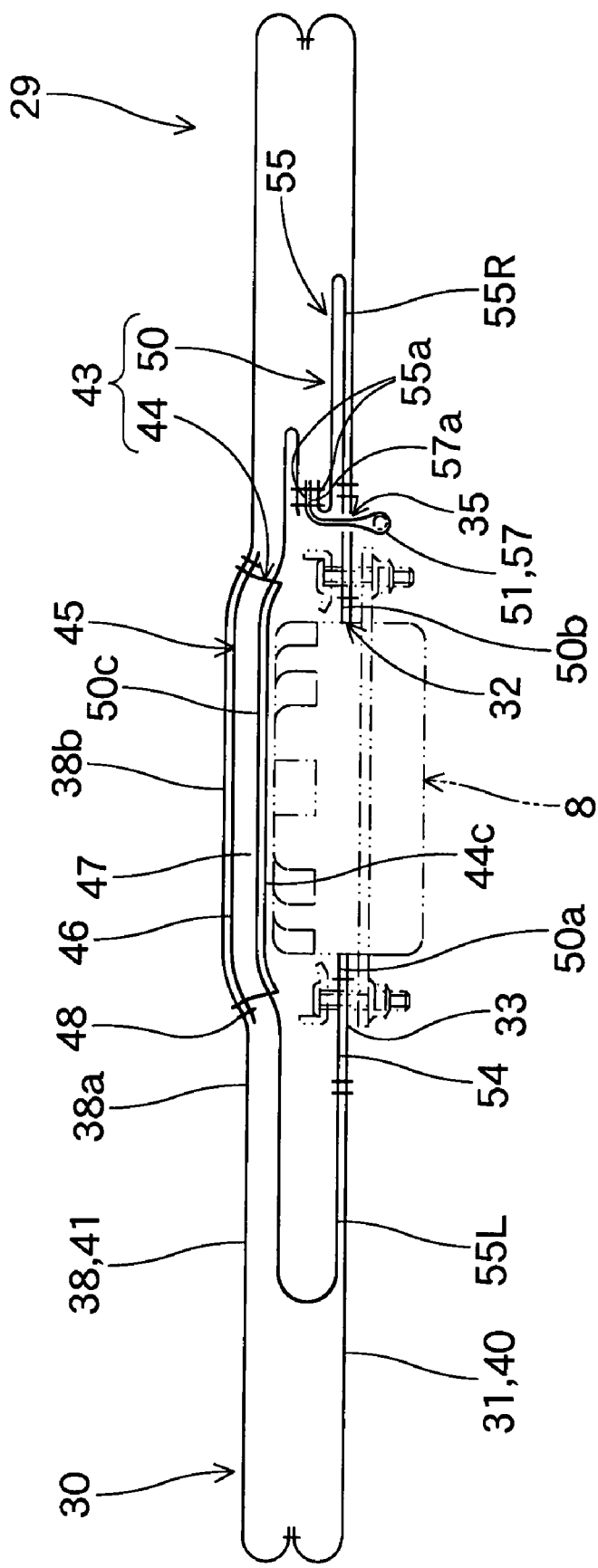
FIG. 7 is a schematic section of the airbag of FIG. 5 taken long the lateral direction for showing a loop projected from an aperture.

As shown in FIGS. 3 and 4, bottom wall 13 is provided in its lower side and proximate the aperture 13b with a retaining mechanism 21 for retaining loop 51 of vehicle body side tether belt 50. Retaining mechanism 21 includes a retaining pin 22 to be put through loop 51 and retain loop 51 and an actuator 23 secured to the lower side of bottom wall 13 for retracting pin 22. If actuator 23 operates to retract pin 22, retaining pin 22 stops retaining loop 51 and releases the same. Actuator 23 can be any of piston cylinder utilizing fluid pressure such as hydraulic pressure, water pressure, air pressure, or gas pressure generated by inflation gas fed from the inflator, a motor utilizing the above-mentioned fluid pressure or electricity, an electromagnetic solenoid, a spring which exerts biasing force, or the like, provided that it can move retaining pin 22 in response to an electric signal from control device 60. As shown in FIG. 4, in the opposite periphery of aperture 13b with respect to actuator 23 and on the lower side of bottom wall 13 is a support 13c for supporting the leading end of pin 22 of retaining mechanism 21 and preventing the same from coming off from loop 51 in the retaining mode.

As shown in FIG. 3, holder plate 16 is secured to holder body 12, and has holding portions 16a extending up to the vicinity of cladding layer 3 disposed proximate ring R in spokes S in the left and right sides. A horn switch 17 is attached to each of holding portions 16a. Airbag apparatus M is indirectly supported by a joining plate 19 secured to core 2 at a first end and to the lower side of horn switch 17 at a second end, and thus airbag apparatus M is mounted on top of boss B of wheel body 1.

Pad 25 serving as an airbag cover is made from synthetic resin such as thermo-plastic elastomer of olefin, and covers the upper side of boss B as shown in FIGS. 2 and 3. Pad 25 is provided, in an area encircled by side wall 14 of bag holder 11, with doors 26 openable upon airbag inflation and a generally H-shaped breakable portion 27 arranged around doors 26. In the illustrated embodiment, as shown in FIG. 2, two doors 26 are disposed one in front of the other so they open toward the front and rear directions. Pad 25 is secured to side wall 14 of bag holder 11 with unillustrated rivets or the like.

As shown in FIGS. 5 to 7, 9A, 9B and 10, airbag 29 includes a bag-shaped airbag body 30 inflatable with inflation gas, and a tether 43 for regulating the contour of airbag body 30 at complete inflation.

Airbag body 30 is formed of flexible fabric woven by polyamide, polyester yarn or the like. The outer circumferential wall of airbag body 30 is composed of a vehicle body side wall 31 and an occupant side wall 38. Vehicle body side wall 31 is deployed toward steering wheel W upon airbag deployment and includes a gas inlet port 32 for receiving inflator body 8a and admitting inflation gas discharged from inflator 8. Inlet port 32 is disposed in the vicinity of the center of vehicle body side wall 31. Occupant side wall 38 is deployed toward an occupant MD upon airbag deployment. In a periphery 33 of gas inlet port 32 are mounting holes 34 for receiving bolts 6a of retainer 6. Airbag 29 is attached to bag holder 11 at periphery 33 of inlet port 32 utilizing retainer 6. On a right side of and in periphery 33 of inlet port 32 is an aperture 35 which loop 51 of vehicle body side tether belt 50 is put through. Vehicle body side wall 31 is further provided at predetermined positions with vent holes 36 for exhausting extra gas.

Figure 8:
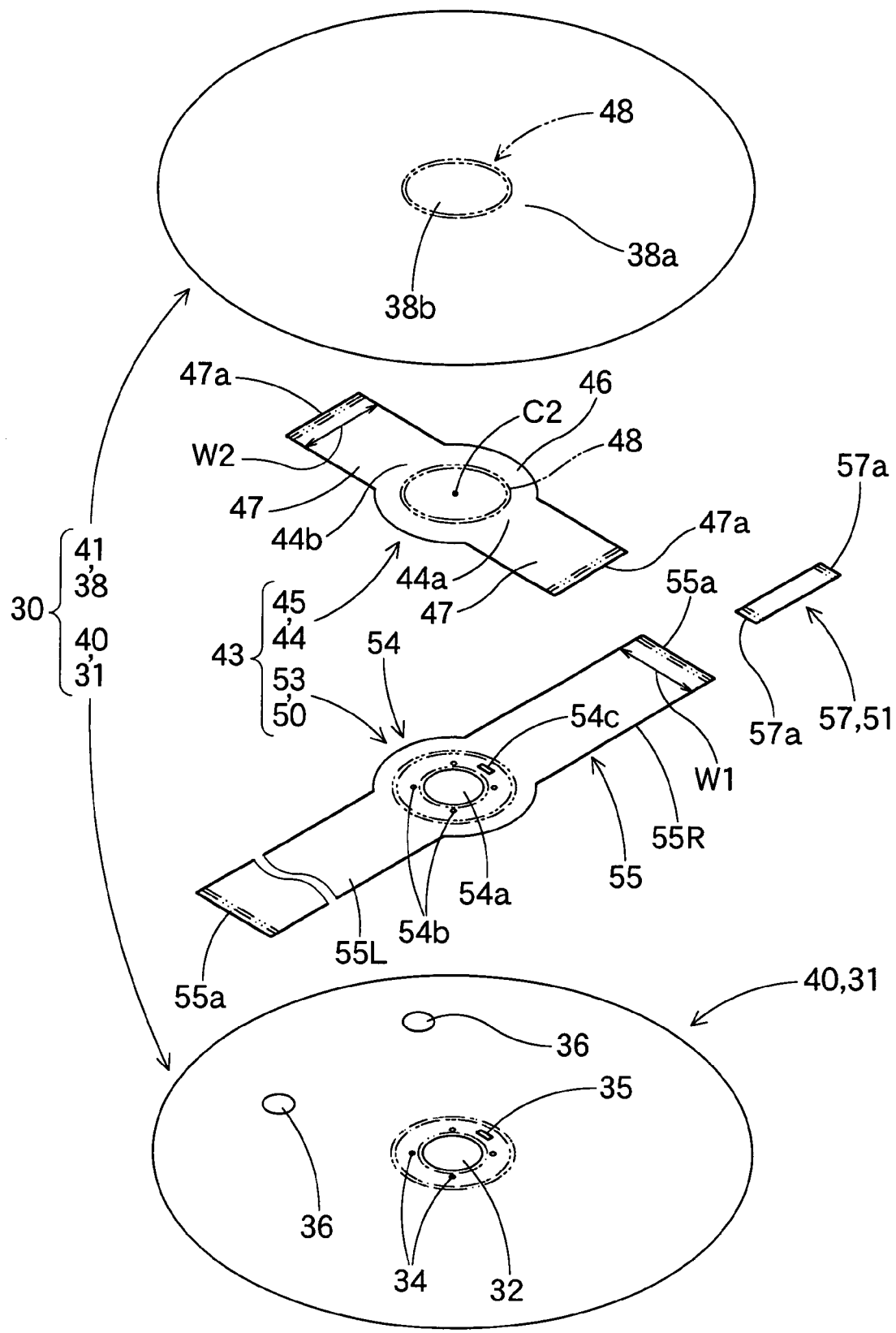
FIG. 8 is an exploded perspective view showing components of the airbag of FIG. 5.

As shown in FIG. 8, airbag body 30 is composed of a circular vehicle body side base cloth 40 for forming vehicle body side wall 31 and a circular occupant side base cloth 41 for forming occupant side wall 38. Gas inlet port 32 is formed at the center of vehicle body side base cloth 40 whereas mounting holes 34, aperture 35, and vent holes 36 are formed at predetermined positions of base cloth 40.

Tether 43 is formed of flexible fabric woven by polyamide, polyester yarn or the like as well as airbag body 30. As shown in FIG. 8, tether 43 includes an occupant side tether belt 44 joined to occupant side wall 38 and a vehicle body side tether belt 50 linked with occupant side tether belt 44 and joined to vehicle body side wall 31.

Figure 10:
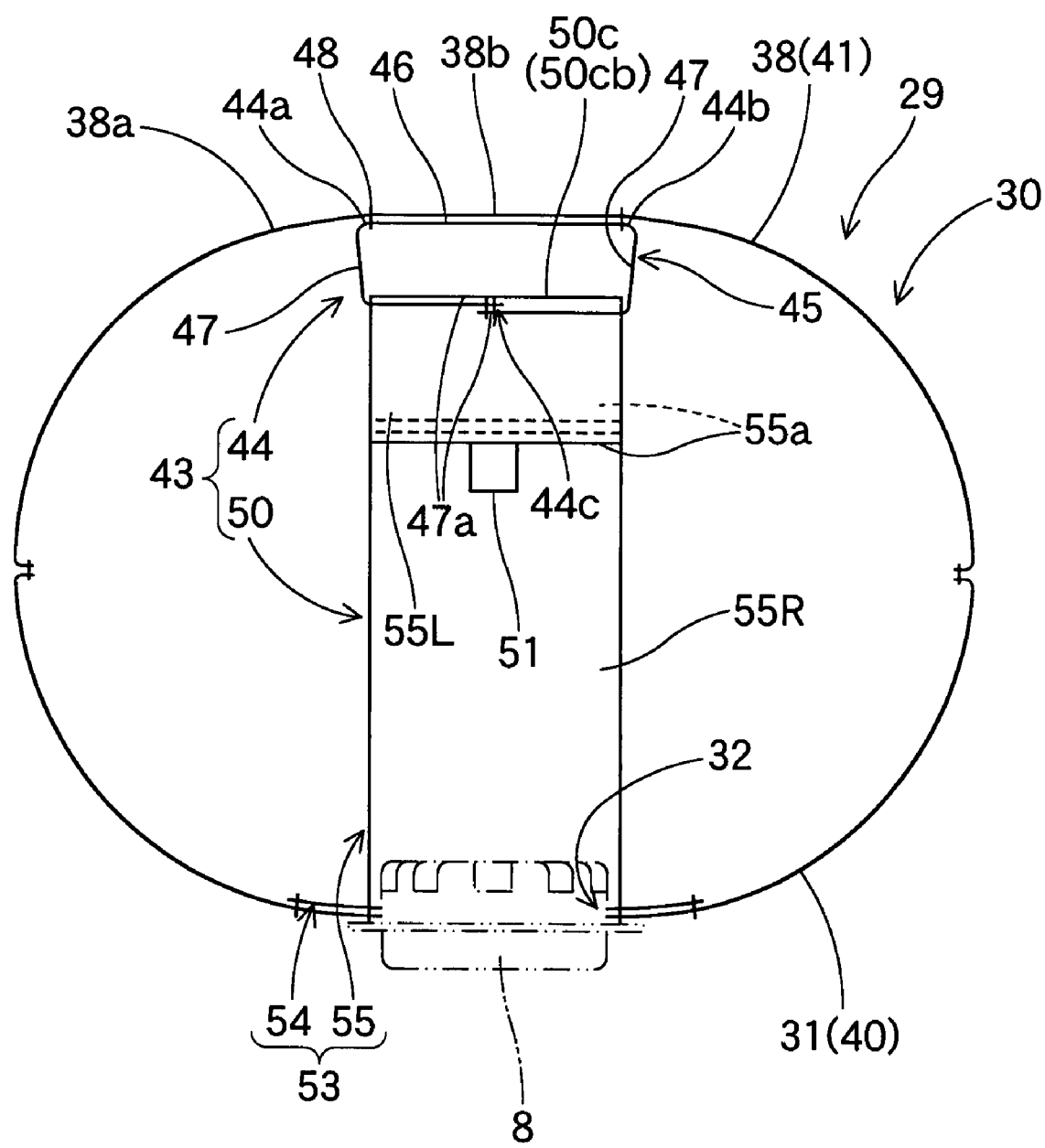
FIG. 10 is a schematic section of the airbag of FIG. 5 inflated by itself taken along the longitudinal direction when the loop is released from the retaining mechanism.

Occupant side tether belt 44, which has a band shape, is joined to occupant side wall 38 at its end portions 44a and 44b, and is arranged along the longitudinal direction inside airbag 29. Specifically, end portions 44a and 44b are joined to two, front and back positions symmetric about the center C1 (FIG. 5) of occupant side wall 38 or occupant side base cloth 41. Referring to FIG. 8, occupant side tether belt 44 is formed of a cloth member 45 including a generally circular joint portion 46 and two tethering portions 47 extending from front and rear edges of joint portion 46 in a band-shape. In this specific embodiment, joint portion 46 is sewn to occupant side base cloth 41 at its entire circumferential edge after its center C2 is matched with the center C1 of occupant side base cloth 41, and leading ends 47a of tethering portions 47 are sewn up together. Thus occupant side tether belt 44 is arranged in a circle as shown in FIG. 10. An area in the middle of occupant side wall 38 constitutes a protection plane 38a adapted to arrest occupant MD upon airbag inflation, and an area further encircled by a sewn-up region or joint region 48 (or by end portions 44a and 44b of occupant side tether belt 44) constitutes a central area 38b of protection plane 38a.

Figure 9A:
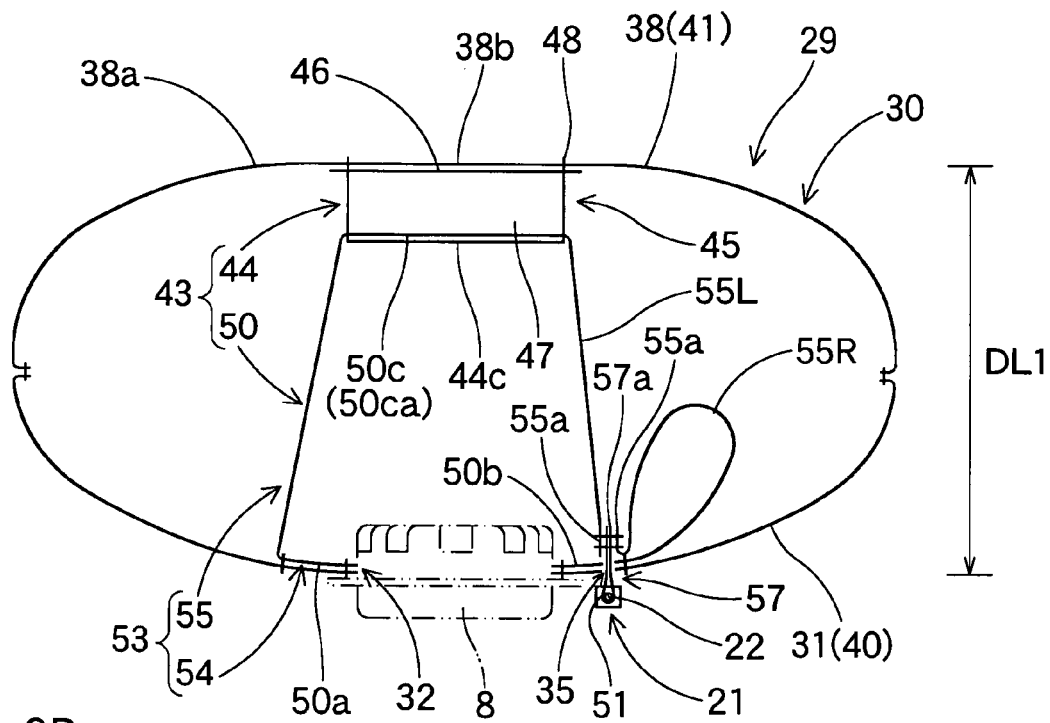
FIGS. 9A and 9B are schematic sections of the airbag of FIG. 5 inflated by itself taken along the lateral direction, showing the cases where the loop is retained by a retaining mechanism and is released from the retaining mechanism.
Figure 9B:
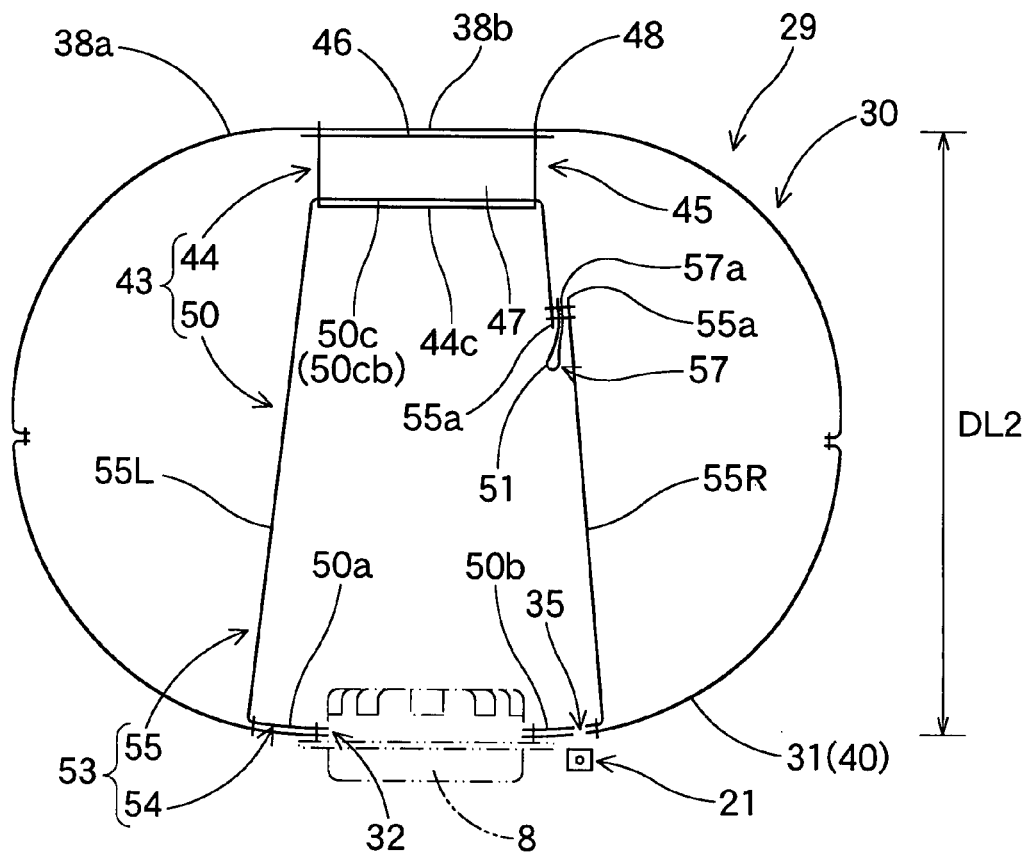

Vehicle body side tether belt 50, which has a band shape, is joined to vehicle body side wall 31 at its end portions 50a and 50b, and is arranged along the lateral direction inside airbag 29. Specifically, end portions 50a and 50b are joined to two, left and right positions symmetric about the center C3 (FIG. 6) of inlet port 32 in the periphery of inlet port 32. In the illustrated embodiment, tether belt 50 includes a loop 51 to be held by retaining mechanism 21 at its intermediate region (FIGS. 9A and 9B). When airbag 29 is in a housed state, loop 51 is put through aperture 35 of vehicle body side wall 31 to project from aperture 13b formed on bottom wall 13 of bag holder 11, and is retained by pin 22 of retaining mechanism 21 put there through. When airbag 29 is inflated with loop 51 released from retaining mechanism 21 (FIG. 9B), loop 51 is located at the right side of a later-described link portion 50cb of vehicle body side tether belt 50 with occupant side tether belt 44 and inside vehicle body side tether belt 50 (FIG. 9B). As will be described later, link portion 50cb is disposed at the center of vehicle body side tether belt 50.

To describe vehicle body side tether belt 50 more specifically, it is formed of a cloth member 53 including a generally circular joint portion 54 and two tethering portions 55 extending from left and right edges of joint portion 54 in a band-shape. Loop 51 is formed of a band-shaped cloth member 57 which is separate from cloth member 53 for vehicle body side tether and has a narrower width than tethering portions 55. At the center of joint portion 54 is an opening 54a corresponding to gas inlet port 32, and at predetermined positions in the periphery of opening 54a are mounting holes 54b and an aperture 54c corresponding to mounting holes 34 and aperture 35 of vehicle body side wall 31. A left side tethering portion 55L has a longer length than a right side tethering portion 55R. In this specific embodiment, joint portion 54 of vehicle body side tether belt 50 is sewn to vehicle body side base cloth 40 at its entire circumferential edge after the center of opening 54a is matched with the center of gas inlet port 32. As best shown in FIG. 9B, left side tethering portion 55L is put through a space between occupant side tether belt 44 and occupant side wall 38, whereas cloth member 57 for loop is folded into two at its center, and both ends 57a of cloth member 57 in folio are disposed between leading ends 55a of left and right tethering portions 55L and 55R. Then leading ends 55a of tethering portions 55L and 55R are sewn up together with cloth member 57. Thus vehicle body side tether belt 50 and occupant side tether belt 44 are linked together so that each of tether belts 44 and 50 is bifurcate from a mutual link portion and arranged in a circle inside airbag 29. Moreover, vehicle body side tether belt 50 is joined to bag holder 11 at an area of joint portion 54 together with vehicle body side wall 31 of airbag 29, with the use of retainer 6. The width W1 (FIG. 8) of vehicle body side tether belt 50 is set greater than the inner diameter D1 (FIG. 6) of gas inlet port 32 which is generally equal to the outer diameter of inflator body 8a, such that tether belt 50 covers inflator 8. Consequently, vehicle body side tether belt 50 is arranged in such a manner as to cover left and right sides of inflator 8 and be opened to and fro, so that it redirects inflation gas discharged from inflator 8 to and fro into airbag 29.

In the foregoing embodiment, occupant side tether belt 44 is arranged along the longitudinal direction in a circle whereas vehicle body side tether belt 50 linked with occupant side tether belt 44 is arranged along the lateral direction in a circle in airbag 29. That is, occupant side tether belt 44 and vehicle body side tether belt 50 are generally orthogonal to each other in a plan view. When airbag 29 is fully inflated, moreover, occupant side tether belt 44 and vehicle body side tether belt 50 are linked with each other in such a manner that respective middle portions in the longitudinal and lateral directions, i.e. link portions 44c and 50c, are overlaid one on the other and retain each other. In the illustrated embodiment, the widths W1 and W2 of occupant side tether belt 44 and vehicle body side tether belt 50 are the same.

In airbag 29, depending on whether loop 51 is retained by retaining mechanism 21 or not, the substantial length of vehicle body side tether belt 50 is changed by the length of the right tethering portion 55R, so that a link portion 50c of vehicle body side tether belt 50 with occupant side tether belt 44 is displaced laterally on tether belt 50 as shown in FIGS. 9A and 9B. More specifically, when airbag 29 is inflated with loop 51 retained by retaining mechanism 21, vehicle body side tether belt 50 is formed only by left tethering portion 55L as shown in FIG. 9A. Accordingly, a link portion 50ca of vehicle body side tether belt 50 with occupant side tether belt 44 is disposed generally in the vicinity of the center of left tethering portion 55L. When airbag 29 is inflated with loop 51 released from retaining mechanism 21, vehicle body side tether belt 50 is formed by left tethering portion 55L and right tethering portion 55R as shown in FIG. 9B. Accordingly, a link portion 50cb of vehicle body side tether belt 50 with occupant side tether belt 44 is disposed generally in the vicinity of the center of left tethering portion 55L and right tethering portion 55R coupled at leading ends 55a, and in the vicinity of loop 51. In a plan view, link portions 44c and 50c (50ca, 50cb) of occupant side tether belt 44 and vehicle body side tether belt 50 are arranged at the center of fully inflated airbag 29, i.e., at a position generally corresponding to the center of gas inlet port 32.

Figure 11:
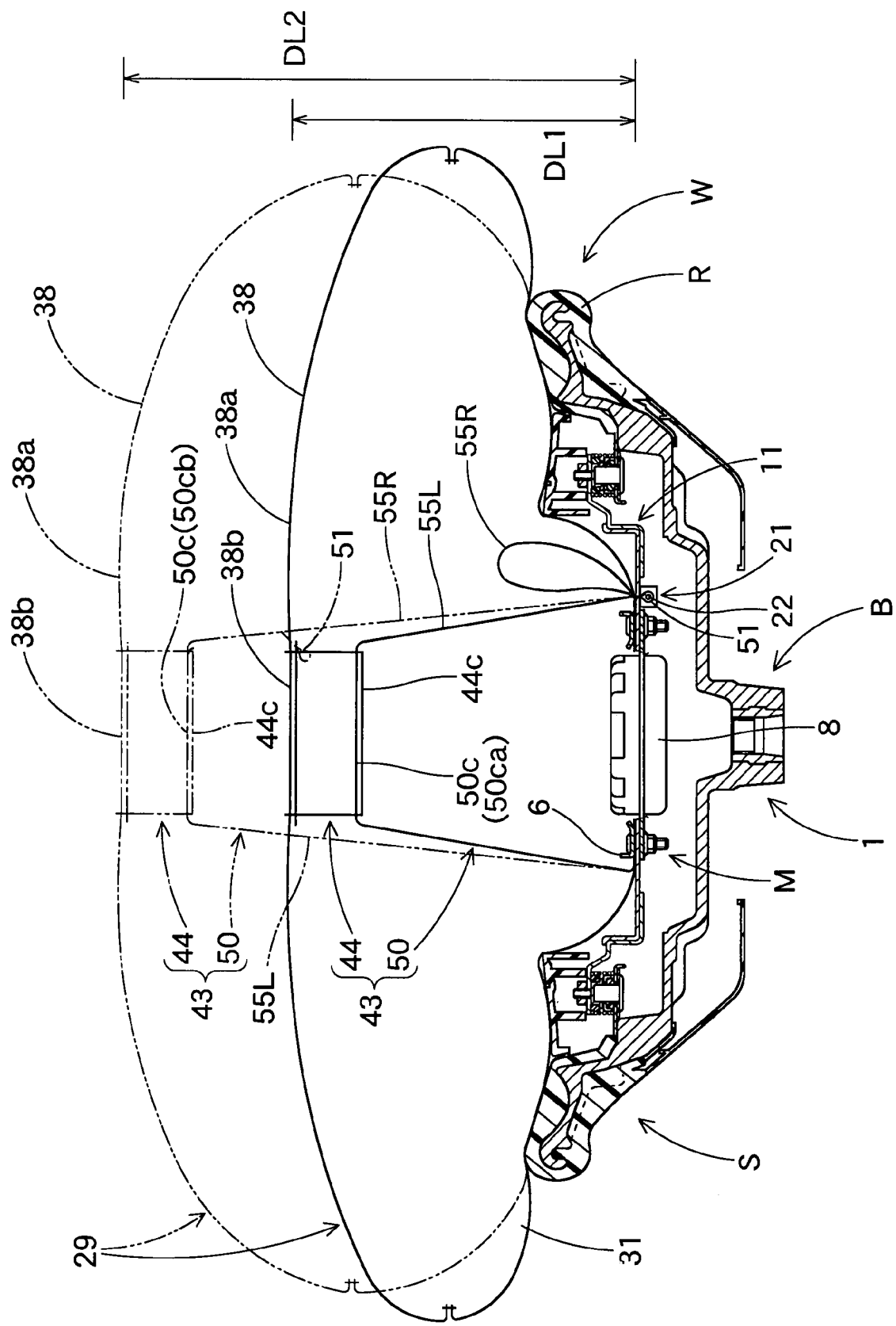
FIG. 11 is a schematic vertical section of the airbag apparatus of FIG. 3 in service.

When airbag 29 inflates, occupant side tether belt 44 and vehicle body side tether belt 50 are slidable on each other at respective link portions 44c and 50c (50ca, 50cb). With this structure, irrespective of the position of link portion 50c (whether 50ca or 50cb), link portion 44c of occupant side tether belt 44 with vehicle body side tether belt 50 is positioned proximate its longitudinal center, i.e., proximate the sewn-up region of leading end portions 47a of tethering portions 47, and the displacement of link portion 50c (50ca or 50cb) of vehicle body side tether belt 50 does not affect the distance from link portion 44c to ends 44a and 44b, so that the distance are constantly generally uniform. Accordingly, as shown in FIG. 11, central area 38b of protection plane 38a at the time airbag 29 is inflated with loop 51 retained by retaining mechanism 21 and the length of vehicle body side tether belt 50 shortened, when a clearance in vehicle body side tether belt 50 between bag holder 11 and occupant side tether belt 44 is small, and central area 38b of protection plane 38a at the time airbag 29 is inflated with loop 51 released from retaining mechanism 21 and the length of vehicle body side tether belt 50 lengthened, when the clearance in vehicle body side tether belt 50 between bag holder 11 and occupant side tether belt 44 is large, are generally parallel to each other.

How to manufacture airbag 29 of the embodiment is now described. Gas inlet port 32 is preliminarily formed on vehicle body side base cloth 40, whereas opening 54a is formed on joint portion 54 of cloth member 53 for vehicle body side tether belt 50. Firstly, cloth member 45 for occupant side tether 45 is arranged on the inner surface of occupant side base cloth 41, and joint portion 46 is sewn to base cloth 41 at the location of sewn-up region 48. Then leading ends 47a of tethering portions 47 are sewn up, and thereby forming occupant side tether belt 44. Subsequently, cloth member 53 for vehicle body side tether is arranged on the inner surface of vehicle body side base cloth 40 so that its opening 54a matches inlet port 32, and joint portion 54 is sewn to base cloth 40 at its entire periphery. Thereafter, punching work is applied to vehicle body side base cloth 40 and joint portion 54 to provide vent holes 36, mounting holes 34 and 54b and apertures 35 and 54c. Inlet port 32 may be formed at this time. In that instance, base cloth 40 and cloth member 53 will not be provided with inlet port 32 and opening 54a until the above sewing work.

Subsequently, vehicle body side base cloth 40 and occupant side base cloth 41 are overlaid one on the other so that their outer surfaces oppose each other, and are sewn up at the outer edge. After the sewing work of the outer edge, airbag body 30 is reversed inside out utilizing inlet port 32 so the seam allowance may not be exposed outside. Then left tethering portion 55L of cloth member 53 for vehicle body side tether is put through between occupant side tether belt 44 and occupant side wall 38 (occupant side base cloth 41), and in that state, leading ends 55a of left and right tethering portions 55L and 55R are taken out of inlet port 32. Cloth member 57 for loop in folio is disposed between leading ends 55a, and then leading ends 55a of tethering portions 55L and 55R are sewn up together with opposite ends 57a of cloth member 57. Thus vehicle body side tether belt 50 is formed, and airbag 29 is completed.

Airbag apparatus M is assembled using airbag 29 manufactured as described above. Firstly, retainer 6 is set in airbag 29 from inlet port 32 so that bolts 6a are protruded from mounting holes 34. Then airbag 29 is so folded up as to be housed in bag holder 11. At this time, loop 51 is taken out of aperture 35. Subsequently, the folded-up airbag 29 is housed within bag holder 11 preliminarily provided with retaining mechanism 21, horn switches 17, and joining plates 19 so that bolts 6a are projected from bottom wall 13 and loop 51 is protruded from aperture 13b. Then retaining pin 22 of retaining mechanism 21 is put through loop 51 so the leading end of pin 22 is supported by support 13c, and thus retaining mechanism 21 retains loop 51. Thereafter, body 8a of inflator 8 is put into insert hole 13a of bottom wall 13 from lower side, and nuts 7 are fastened to bolts 6a protruded from flange 8c. Thus airbag 29 and inflator 8 are held by bag holder 11. Thereafter, pad 25 is placed over airbag 29 and joined to side wall 14 of bag holder 11 with unillustrated rivets. Thus airbag apparatus M is assembled.

Airbag apparatus M thus assembled is mounted on steering wheel body 1 by attaching joining plates 19 to unillustrated mounting seats of wheel body 1 mounted on vehicle with bolts. At this time, assembling of steering wheel W and mounting of steering wheel W on the vehicle are completed. When airbag apparatus M is mounted on the vehicle, lead wires extending from control device 60 are connected with inflator 8 and retaining mechanism 21 for supplying actuating signals.

If a moving car equipped with airbag apparatus M cracks up, control device 60 outputs signals to inflator 8, and then inflator 8 discharges inflation gas from gas discharge ports 8b to inflate airbag 29, so that airbag 29 pushes and opens doors 26 of pad 25, and deploys to cover the top side of steering wheel W, and then completes inflation as shown in FIGS. 1 and 11.

In the airbag apparatus M of this embodiment, airbag 29 inflates while the clearance between occupant side wall 38 and bag holder 11 serving as the housing of airbag is varied depending on a seated occupant MD. For example, if control device 60 detects an undersized occupant MD1 seated proximate steering wheel W by signals fed from position sensor 61, weight sensor 62 and crash sensor 63, airbag 29 inflates in a condition where loop 51 formed at an intermediate position of vehicle body side tether belt 50 is retained by retaining mechanism 21. That is, airbag 29 inflates with a reduced clearance DL1 between occupant side wall 38 and bag holder 11 by tether 43 as shown in FIGS. 9A and 11. Accordingly, airbag 29 protects undersized occupant MD1 located proximate steering wheel W properly without pushing occupant MD1 unduly.

To the contrary, if control device 60 detects a large occupant MD2 seated away from steering wheel W (or airbag apparatus M), loop 51 is released from retaining mechanism 21 prior to airbag inflation. That is, airbag 29 inflates after actuator 23 operates to retract retaining pin 22 to release loop 51 from retaining mechanism 21. Accordingly, airbag 29 inflates with a large clearance DL2 between occupant side wall 38 and bag holder 11 by tether 43 as shown in FIGS. 9B and 11 (by phantom lines). Hence airbag 29 inflates thickly and properly protects large driver MD2 even if he/she has a great kinetic energy by being large and being seated away from steering wheel W, without causing a bottoming-out of occupant MD2.

In airbag apparatus M, occupant side tether belt 44 is linked with vehicle body side tether belt 50 in such a manner that link portion 44c of occupant side tether belt 44 is slidable on vehicle body side tether belt 50. With this structure, the clearance in vehicle body side tether belt 50 between bag holder 11 and occupant side tether belt 44 is variable into reduced clearance and large clearance, thereby varying the clearance DL1, DL2 between occupant side wall 38 and bag holder 11. As a result, airbag 29 inflates with generally parallel central area 38b of protection plane 38a in occupant side wall 38 with either clearance DL1, DL2, as shown in FIG. 11. That is, central area 38b of protection plane 38a at the time loop 51 of vehicle body side tether belt 50 is retained by retaining mechanism 21 and central area 38b at the time loop 51 is released from retaining mechanism 21 are generally parallel at full inflation of airbag 29. Accordingly, the fully inflated airbag 29 protects occupant MD in a stable manner with its protection plane 38a having a uniform orientation irrespective of whether the clearance DL1, DL2 between occupant side wall 38 and bag holder 11 is set small or large.

Therefore, with airbag apparatus M of the present invention, the contour of airbag 29 at full inflation is controllable depending upon a distance of occupant MD (MD1 or MD2) from steering wheel W (or airbag apparatus M) or a seating position of occupant MD (MD1 or MD2), so that occupant MD (MD1 or MD2) will be properly protected by fully inflated airbag 29.

In airbag apparatus M, the clearance between occupant side wall 38 and bag holder 11 is adjusted by operating a single retaining mechanism 21 by control device 60 to release or retain loop 51 of vehicle body side tether belt 50 when airbag 29 inflates. In other words, the contour of airbag 29 at full inflation is controlled by a single retaining mechanism 21. This will simplify the structure of the airbag apparatus, and will conduce to reduce the weight of the apparatus and the cost required to manufacture the apparatus.

Figure 14:
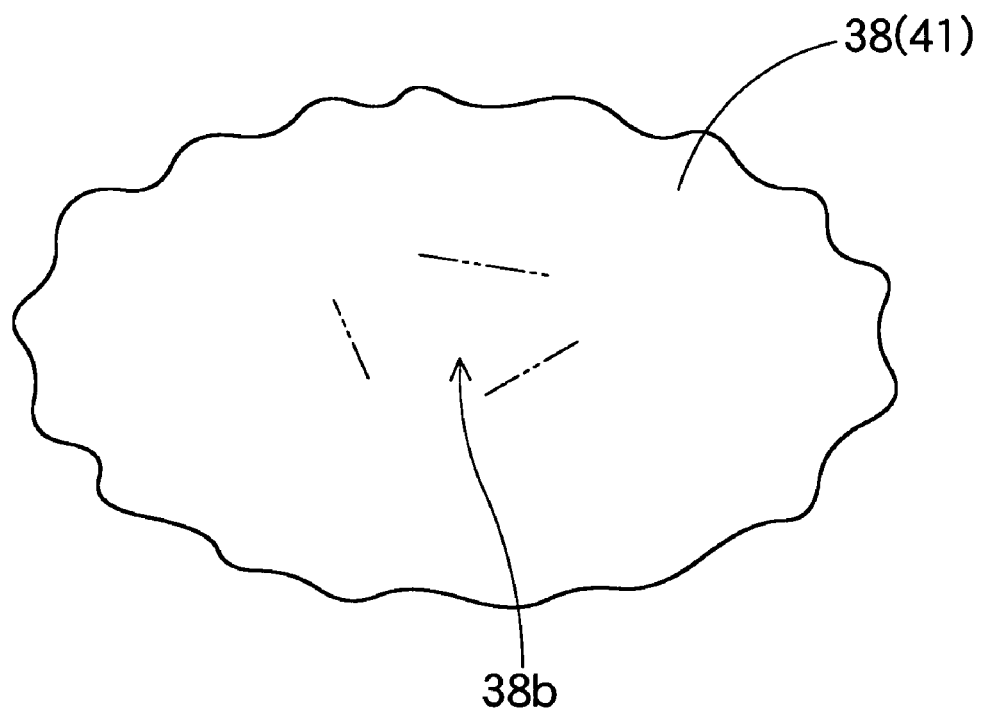
FIG. 14 is a schematic exploded perspective view of a modification of an occupant side tether belt.
Figure 14:
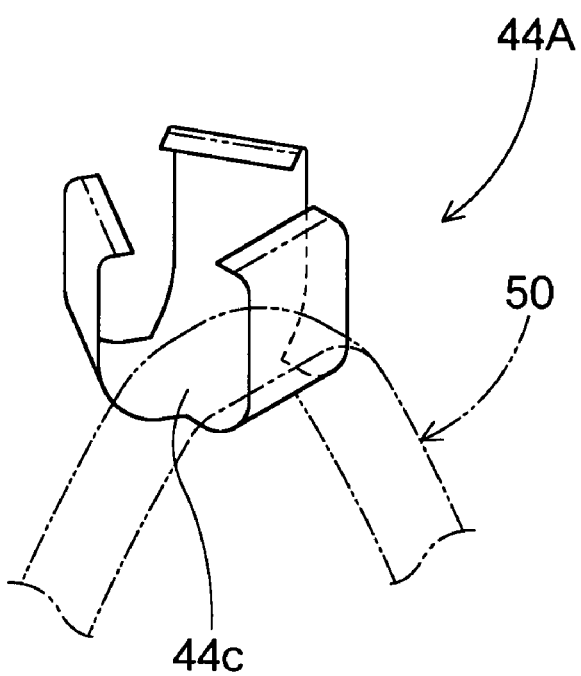

In airbag apparatus M, moreover, occupant side tether belt 44 is joined to occupant side wall 38 at two positions leading from a bifurcate point on link portion 44c, and central area 38b of protection plane 38a in occupant side wall 38 is defined by the area surrounded by end portions 44a and 44b of occupant side tether belt 44 or sewn-up region 48. That is, a flat plane of central area 38b is easily obtained since occupant side wall 38 is connected to occupant side tether belt 44 at two positions, so that the orientation of protection plane 38a or central area 38b is stabilized at full inflation of airbag 29. In the illustrated embodiment, protection plane 38a of fully inflated airbag 29 is arranged generally in parallel to a ring plane Rf of steering wheel W (FIG. 1). Occupant side tether belt 44 in this embodiment is joined to occupant side wall 38 by sewing the entire circumference of the round joint portion 46 to occupant side wall 38. However, it will also be appreciated to use a single band-shaped cloth member for occupant side tether belt 44 by sewing opposite ends of the cloth member to the occupant sidewall. Nevertheless, in order to secure a sufficient joint strength of the occupant side tether to the occupant side wall, the tether is preferably joined to the occupant side wall utilizing joint portion 46 joined to wall 38 by the round sewn-up region 48 as in the foregoing embodiment. "Bifurcate" in this specification is used to describe the arrangement of occupant side tether belt 44 which extends in a bifurcated fashion from its center i.e. link portion 44c, and is joined to occupant side wall 38 at its leading ends 44a and 44b. However, the contour of occupant side tether should not be limited to the bifurcate contour. Provided that the occupant side tether includes a link portion slidable on the vehicle body side tether, the contour may be trifurcate like an occupant side tether belt 44A shown in FIG. 14. Tether belt 44A includes three tethering portions extending in a trifurcate or radial manner from its link portion 44c, and is joined to occupant side wall 38 at the leading ends of the tethering portions.

Figure 12A:
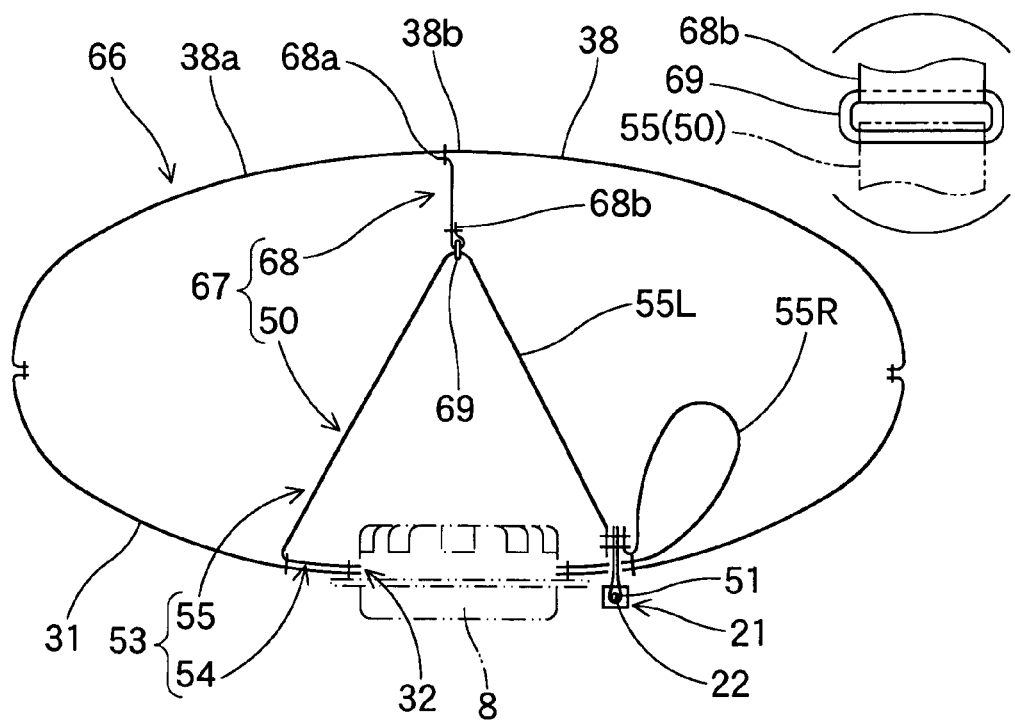
FIGS. 12A and 12B are schematic sections of a modification of the airbag of the present invention inflated by itself, showing the cases where an intermediate portion of a vehicle body side tether belt is retained by a retaining mechanism and is released from the retaining mechanism.
Figure 12B:
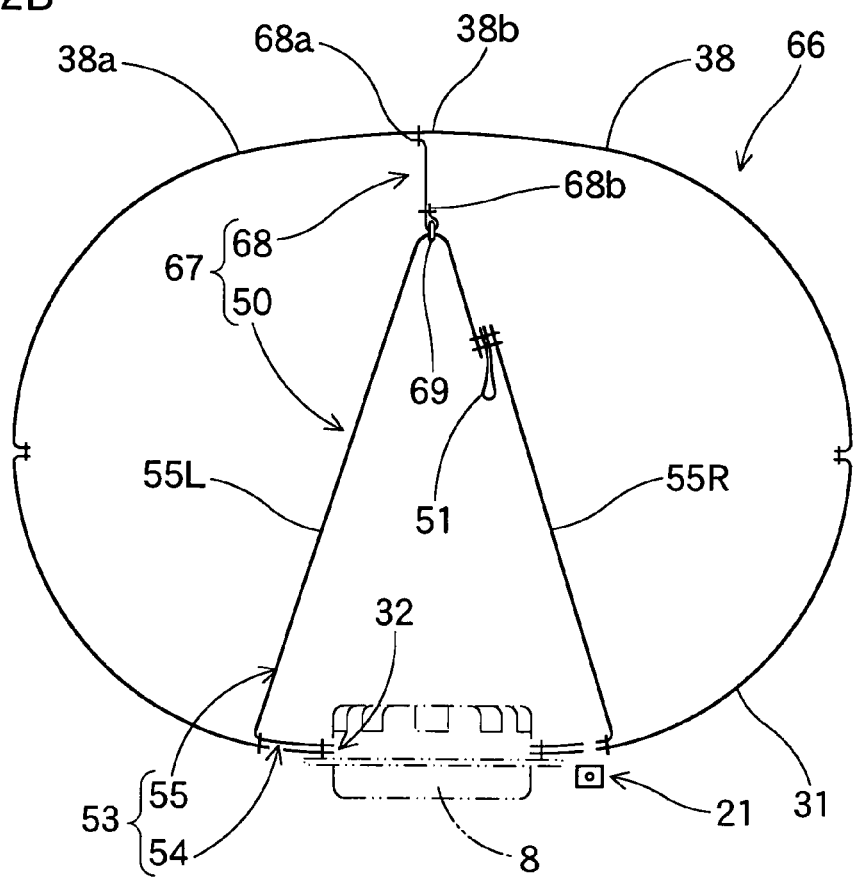

Without considering the above advantage, an airbag 66 shown in FIG. 12 may be used. Airbag 66 includes a tether 67 further having an occupant side tether belt 68 and a vehicle body side tether belt 50. Vehicle body side tether belt 50 has a similar structure to that in above-described airbag 29. Occupant side tether belt 68 is a band-shaped member having its width direction arranged along the longitudinal direction. It is joined to occupant side wall 38 at its first end 68a, that is, at only one position, in central area 38b of protection plane 38a. At its second end 68b is a ring 69 for receiving vehicle body side tether belt 50 and serving as a link portion of vehicle body side tether belt 50 and occupant side tether belt 68. With this tether 67, too, vehicle body side tether belt 50 and occupant side tether belt 68 are slidable on each other through ring 69. Accordingly, as shown in FIGS. 12A and 12B, central area 38b of protection plane 38a (or the vicinity where the first end 68a of tether belt 68 is connected) is generally parallel at full inflation of airbag 66 either when loop 51 formed at an intermediate position of vehicle body side tether belt 50 is retained by retaining mechanism 21 or when loop 51 is released from retaining mechanism 21. Therefore, the fully inflated airbag 66 will protect an occupant in a stable manner by its protection plane 38a.

In airbag apparatus M of the embodiment, vehicle body side tether belt 50, which has an elongate contour, is joined to periphery 33 of gas inlet port 32 in vehicle body side wall 31 at its opposite ends 50a and 50b. Link portion 50c with occupant side tether belt 44 is located between opposite ends 50a and 50b. That is, link portion 50c (50ca, 50cb) of vehicle body side tether belt 50 with occupant side tether belt 44 is constantly disposed on a central axis of gas inlet port 32. This structure is preferable for an airbag apparatus M for a steering wheel using such a round airbag as this embodiment in which gas inlet port 32 is located at the center of vehicle body side wall 31 and protection plane 38a is arranged at the center of occupant side wall 38 disposed in parallel to the opening plane of inlet port 32 at full inflation, because the clearance between occupant side wall 38 and bag holder 11 is so varied that central area 38b of protection portion 38b is constantly generally in parallel to the opening plane of gas inlet port 32.

Figure 13A:
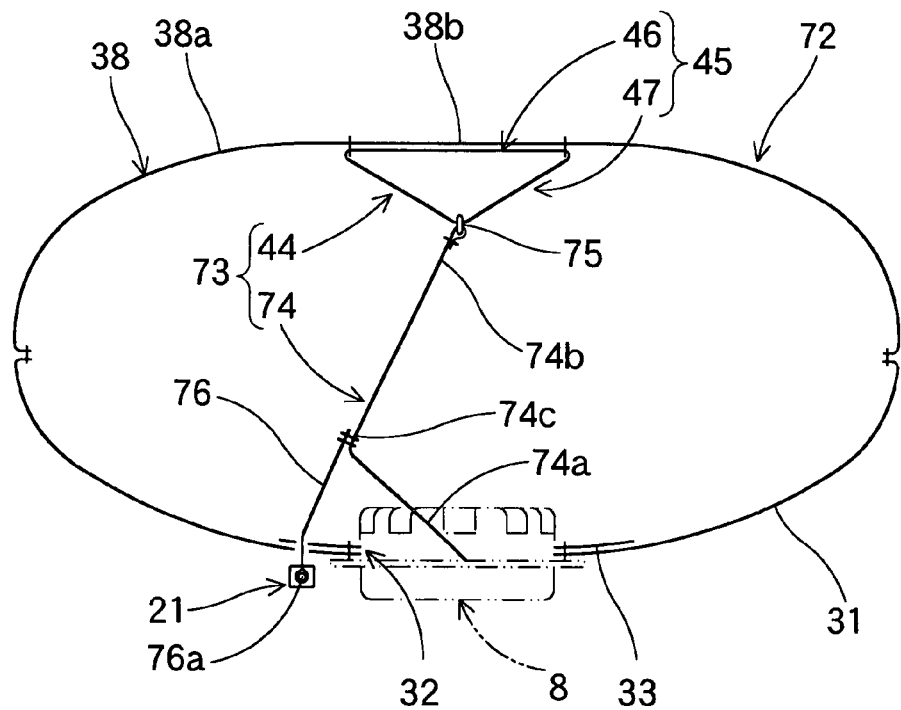
FIGS. 13A and 13B are schematic sections of a further modification of the airbag inflated by itself, showing the cases where an intermediate portion of the vehicle body side tether belt is pulled and is not pulled.
Figure 13B:
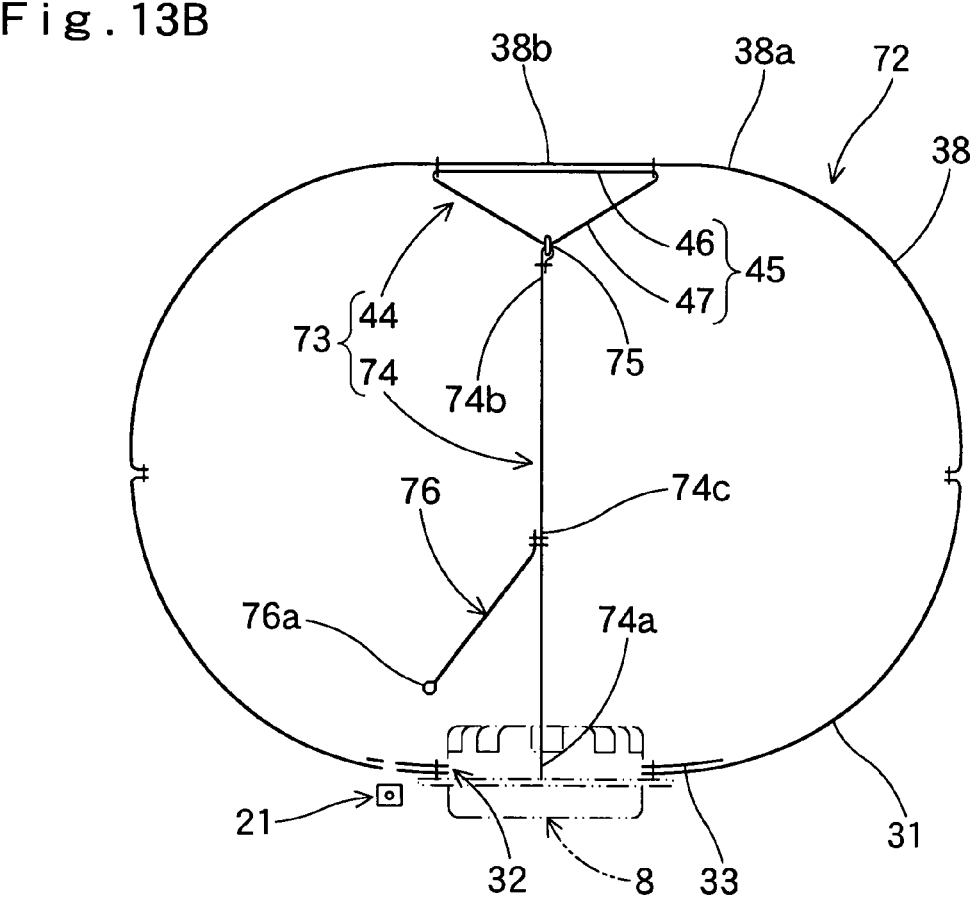

Without considering the above advantage, an airbag 72 shown in FIG. 13 may be used. Airbag 72 includes a tether 73 further having an occupant side tether belt 44 and a vehicle body side tether belt 74. Occupant side tether belt 44 has a similar structure to that in above-described airbag 29. Vehicle body side tether belt 74 is a band-shaped member having its width direction arranged along the lateral direction. It is joined to periphery 33 of gas inlet port 32 in vehicle body side wall 31 at its first end 74a, that is, at only one position. At its second end 74b is a ring 75 for receiving occupant side tether belt 44 and serving as a link portion of vehicle body side tether belt 74 and occupant side tether belt 44. Vehicle body side tether belt 74 is connected to a pulling member 76 at its intermediate portion 74c disposed between opposite ends 74a and 74b. The leading end 76a of pulling member 76 is releasably held by retaining mechanism 21. In operation, when leading end 76a of pulling member 76 is held by retaining mechanism 21, vehicle body side tether belt 74 is pulled by pulling member 76 so its substantial length is shortened and the clearance between vehicle body side wall 31 or bag holder 11 and occupant side tether belt 44 is reduced. If leading end 76a of pulling member 76 is released from retaining mechanism 21, tether belt 74 is not pulled by pulling member 76 so its substantial length is lengthened and the clearance between vehicle body side wall 31 or bag holder 11 and occupant side tether belt 44 is enlarged. With this tether 73, too, vehicle body side tether belt 74 and occupant side tether belt 44 are slidable on each other through ring 75. Accordingly, as shown in FIGS. 13A and 13B, central area 38b of protection plane 38a is generally parallel at full inflation of airbag 72 either when leading end 76a of pulling member 76 is retained by retaining mechanism 21 or when it is released from retaining mechanism 21. Therefore, the fully inflated airbag 72 will protect an occupant in a stable manner by its protection plane 38a.

Occupant side tether belt 44 and vehicle body side tether belt 50 of airbag apparatus M both have band shapes, and are arranged to cross each other at generally right angles, so that they are overlaid one on the other by planes at link portions 44c and 50c (50ca, 50cb) and hold each other in a stable manner. This arrangement will help even the orientation of protection plane 38a of airbag 29 either when loop 51 of vehicle body side tether belt 50 is retained by retaining mechanism 21 (FIG. 9A and solid lines of FIG. 11) or when it is released from retaining mechanism 21 (FIG. 9B and phantom lines of FIG. 11). That is, the orientation of central area 38b of protection plane 38a is stabilized. Especially, in this specific embodiment, tether belts 44 and 50 cross each other at generally right angles, and this will allow tether belts 44 and 50 to slide on each other smoothly at link portions 44c and 50c (50ca, 50cb). Of course, tether belts 44 and 50 do not have to be orthogonal to each other if the above advantage does not have to be considered. Moreover, the occupant side tether belt and the vehicle body side tether belt may be formed of string members, not band-shaped members. Although the tether belts 44 and 50 have the same widths W1 and W2 in this embodiment, the widths of the occupant side tether belt and the vehicle body side tether belt may be different from each other. In addition, each of the occupant side tether belt and the vehicle body side tether belt has a uniform width over the entire length. However, it will also be appreciated that the width is varied halfway by for example reducing the width at the link portion of the occupant side tether belt and/or the vehicle body side tether belt whereas widening the same toward a joint to the occupant side wall and/or the side of the bag holder.

Furthermore, airbag apparatus M of the embodiment uses vehicle body side tether belt 50 arranged to cover the left and right sides of inflator 8 in order to redirect inflation gas fed from inflator 8 to and fro inside airbag 29. This arrangement will help deploy airbag 29 in the longitudinal direction rapidly, that is deploy airbag 29 vertically widely in front of head and abdomen of occupant MD. Especially when airbag 29 inflates with loop 51 of tether belt 50 held by retaining mechanism 21, tether belt 50 will be disposed in proximity to inflator 8 to cover the upper side and lateral sides of inflator 8 upon airbag deployment, thereby enhancing the redirecting or rectifying effect. Consequently, airbag 29 will be deployed in the longitudinal direction further rapidly, and will go into a narrow space between abdomen MB of occupant MD and steering wheel W especially when occupant MD is seated proximate steering wheel W.

Although vehicle body side tether belt 50 is arranged along the lateral direction in this embodiment, it may be arranged along the longitudinal direction whereas the occupant side belt along the lateral direction if the above advantage does not have to be considered.

Although airbag apparatus M of the foregoing embodiments have been described as is mounted on a steering wheel, the application of the present invention should not be limited thereby. For example, the airbag apparatus will be suitable for use in a front passenger's seat, too.

What is claimed is:

1. An airbag apparatus comprising:
   a bag-shaped airbag folded and housed in a housing and inflatable with inflation gas, the airbag being attached to the housing and including an occupant side wall arranged toward a seat upon airbag inflation and a vehicle body side wall arranged toward the housing upon airbag inflation;
   a first elongated tether element and a second elongated tether element that are provided inside the airbag, the first tether element including a first link portion, the second tether element being joined to a side of the housing and including a second link portion, the first tether element and the second tether element being slidably engaged at a link defined by the first and second link portions, the first tether element extending in a bifurcate or radial fashion from the link, and ends of the first tether element being joined to an area of the occupant side wall configured to provide a central area of a protection plane for arresting the occupant such that the central area is encircled by the ends of the first tether element;
   a control device configured to determine a preferred mode of the airbag and to output a control signal; and
   a retaining mechanism controlled by the control signal from the control device, wherein
   when the retaining mechanism holds a part of the second tether element at the side of the housing in which the part is disposed between the side of the housing and the link, a clearance in the second tether element between the housing and the first tether element is reduced, and when the retaining mechanism releases the part of the second tether element, the clearance in the second tether element between the housing and the first tether element is increased, whereby the retaining mechanism is configured to vary the clearance between the occupant side wall and the housing at full inflation of the airbag, and
   the central area of the protection plane of the occupant side wall when the clearance between the occupant side wall and the housing is reduced and the central area of the protection plane when the clearance between the occupant side wall and the housing is increased are generally parallel to each other at full inflation of the airbag.

2. The airbag apparatus of claim 1, wherein
   the second tether element is joined to the side of the housing at opposite ends thereof, and
   the second tether element is linked with the first tether element at an intermediate region thereof.

3. The airbag apparatus of claim 2, wherein
   the first tether element has a band shape, and is joined to the occupant side wall at opposite ends of the length direction thereof,
   the second tether element has a band shape, and is joined to the side of the housing at opposite ends of the length direction thereof, and
   the first tether element and the second tether element are linked with each other in a crossing manner at respective intermediate regions of the first and second tether elements so that the first tether element and the second tether element are overlaid one on the other at the intermediate regions and retain each other.

4. The airbag apparatus of claim 3, wherein the first tether element and the second tether element are arranged generally orthogonal to each other in a plan view.

5. The airbag apparatus of claim 3, wherein
   the airbag apparatus further includes an inflator inserted into the airbag for supplying the airbag with inflation gas,
   the second tether element has a width wide enough to cover sides of the inflator, and
   the second tether element is joined to the vicinity of the sides of the inflator at the opposite ends thereof such that the second tether element redirects the inflation gas toward the width direction of the second tether element inside the airbag.

6. The airbag apparatus of claim 5, wherein the second tether element is arranged generally along the lateral direction of vehicle.

* * * * *